(12) United States Patent
Miyamoto

(10) Patent No.: US 10,860,785 B2
(45) Date of Patent: Dec. 8, 2020

(54) APPARATUS FOR SETTING FILE NAME AND THE LIKE FOR SCAN IMAGE, CONTROL METHOD THEREOF, AND STORAGE MEDIUM

(71) Applicant: CANON KABUSHIKI KAISHA, Tokyo (JP)

(72) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 201 days.

(21) Appl. No.: 16/100,943

(22) Filed: Aug. 10, 2018

(65) Prior Publication Data
US 2019/0065451 A1   Feb. 28, 2019

(30) Foreign Application Priority Data

Aug. 22, 2017   (JP) ................................ 2017-159540

(51) Int. Cl.
*G06F 40/166*   (2020.01)
*H04N 1/00*   (2006.01)
(Continued)

(52) U.S. Cl.
CPC ....... *G06F 40/166* (2020.01); *G06K 9/00463* (2013.01); *G06K 9/2081* (2013.01);
(Continued)

(58) Field of Classification Search
None
See application file for complete search history.

(56) References Cited

U.S. PATENT DOCUMENTS 5,689,342 A * 11/1997 Nakatsuka ......... G06K 9/00442
358/296
7,505,167 B2 * 3/2009 Ehara ..................... G06K 9/325
358/1.16
(Continued)

FOREIGN PATENT DOCUMENTS

JP   2008-176624   7/2008

OTHER PUBLICATIONS

U.S. Appl. No. 16/103,692, filed Aug. 14, 2018.
U.S. Appl. No. 16/103,695, filed Aug. 14, 2018.
U.S. Appl. No. 16/139,996, filed Sep. 24, 2018.

*Primary Examiner* — Fayyaz Alam
(74) *Attorney, Agent, or Firm* — Venable LLP

(57) ABSTRACT

By using a character recognition result of a scan image, a user can set supplementary information such as a file name for the scan image with simple operation. There is provided an apparatus for performing a predetermined process on a scan image obtained by scanning a document, including: a display control unit configured to display a UI screen for performing the predetermined process, the UI screen displaying a character area in the scan image in a selectable manner to a user; and a setting unit configured to perform OCR processing on a character area selected by a user via the UI screen and set supplementary information for the predetermined process by using a character string extracted in the OCR processing, wherein, in a case where a user selects a plurality of character areas, the setting unit determines whether a delimiter should be inserted between the extracted character strings based on a positional relation between the plurality of selected character areas and, if it is determined that a delimiter should be inserted, inserts a delimiter between the extracted character strings.

17 Claims, 13 Drawing Sheets

(51) Int. Cl.
*G06K 9/00* (2006.01)
*G06K 9/20* (2006.01)

(52) U.S. Cl.
CPC ..... *H04N 1/00209* (2013.01); *H04N 1/00331* (2013.01); *H04N 1/00461* (2013.01); *G06K 2209/01* (2013.01); *H04N 2201/0094* (2013.01)

(56) References Cited

U.S. PATENT DOCUMENTS

| | | | | |
|---|---|---|---|---|
| 9,129,036 | B2* | 9/2015 | Dexter | G06F 16/8373 |
| 2010/0121638 | A1* | 5/2010 | Pinson | G10L 15/32 |
| | | | | 704/235 |
| 2010/0188419 | A1* | 7/2010 | Ratnakar | G06T 11/00 |
| | | | | 345/619 |
| 2013/0329263 | A1* | 12/2013 | Enomoto | H04N 1/40 |
| | | | | 358/470 |
| 2014/0078559 | A1* | 3/2014 | Wu | G06K 9/00979 |
| | | | | 358/452 |
| 2014/0141836 | A1* | 5/2014 | Rozumyanskiy | G06K 9/22 |
| | | | | 455/556.1 |
| 2015/0067485 | A1* | 3/2015 | Kim | G06F 40/151 |
| | | | | 715/256 |

* cited by examiner

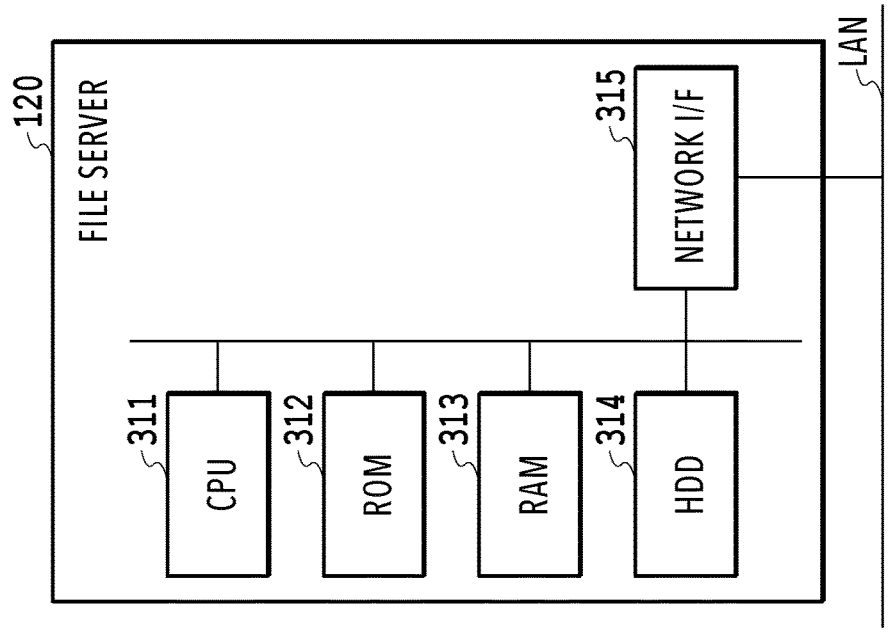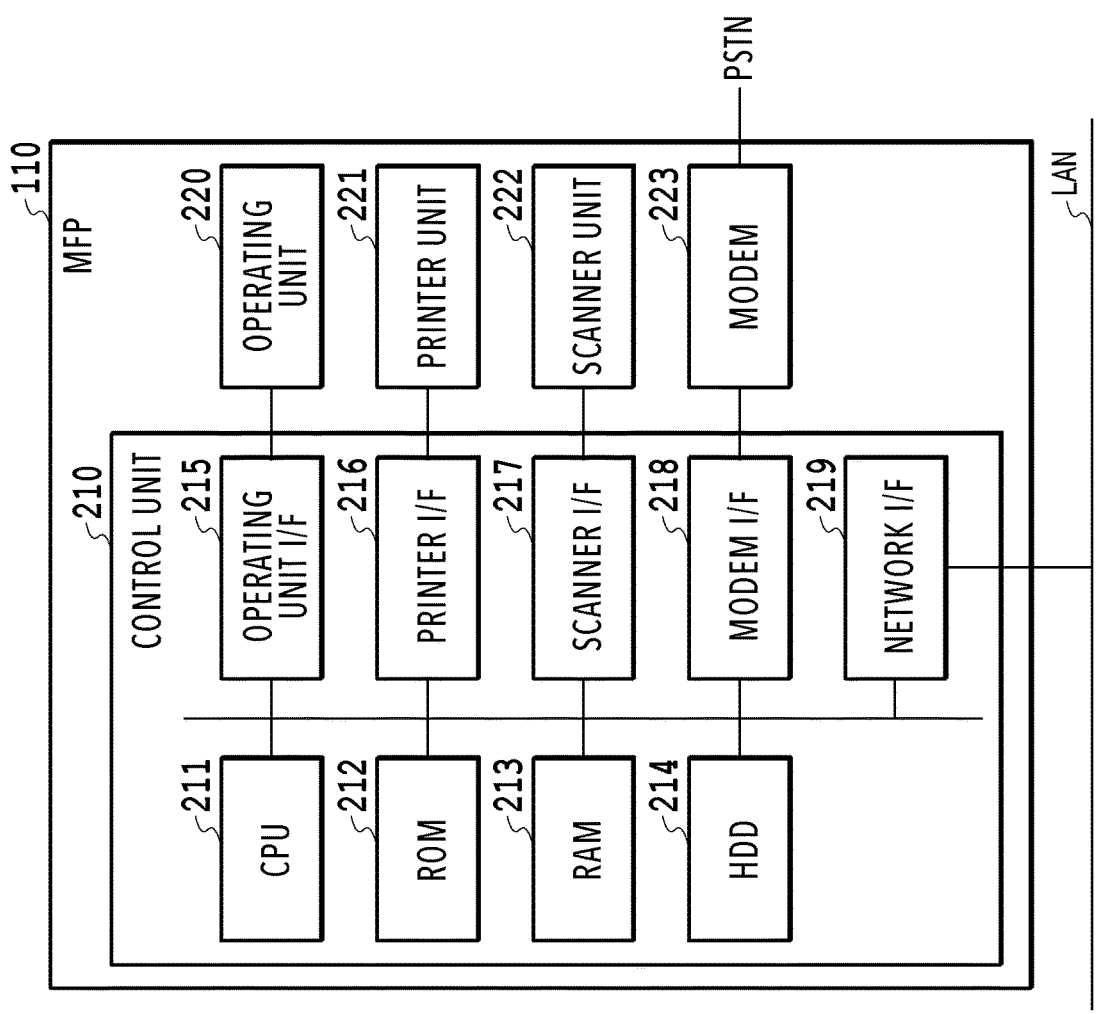

FIG.7A

Preview Screen — 700
701
702 (⚙)

710
711 (←)  713 (+)  714 (−)  712 (→)

QUOTATION

Quotation No.
R-1234

Messrs. Tokyo Corporation

Proposed Delivery Date 04.14.2017

Yokohama Corporation
Yokohama City 1000-1

720 Back
721 Next

APPARATUS FOR SETTING FILE NAME AND THE LIKE FOR SCAN IMAGE, CONTROL METHOD THEREOF, AND STORAGE MEDIUM

BACKGROUND OF THE INVENTION

Field of the Invention

The present invention relates to a technique of using a character recognition result of a scan image and setting a file name and the like for the scan image.

Description of the Related Art

Traditionally, a method of digitizing a paper document by scanning has widely been used as a document managing method. Further, in digitizing a document, there is a technique of performing optical character recognition processing (OCR processing) on scanned image data and using recognized characters for a file name of a digitized document file. For example, Japanese Patent Laid-Open No. 2008-176624 discloses a technique of setting in advance a plurality of areas on which OCR processing is performed for scanned image data and then setting a file name in accordance with a rule indicating a format of the file name set in advance and a character recognition result of each area. Japanese Patent Laid-Open No. 2008-176624 also discloses that in setting a rule indicating a format of the file name, it is possible to add a specific symbol (delimiter) such as a hyphen between character recognition results of the plurality of areas.

In the method disclosed in Japanese Patent Laid-Open No. 2008-176624, however, it is needed to set a target area for the OCR processing and a rule indicating a format of a file name for each type of document. Accordingly, to appropriately give file names to various types of documents, it is needed to set rules beforehand according to the types of documents, which requires much time and effort for the work. In addition, in the method disclosed in Japanese Patent Laid-Open No. 2008-176624, since a delimiter to be inserted between character recognition results of the areas follows the rule set in advance, it is impossible to flexibly determine, depending on an actual scan image, whether to insert a delimiter in giving a file name. A specific example will be given with reference to a figure. FIG. 1 shows a situation of setting a file name for a scan image of a quotation. Now, it is assumed that OCR processing is performed on every area of one continuous string of characters (character area), and a rule of inserting "_(underscore)" between character areas as a delimiter is set. In the example shown in FIG. 1, since "QUOTATION" has spaces between the characters (letters), "QUOTATION" is separated into character areas, each including one character, in spite of the fact that "QUOTATION" should not be separated. As a result, a file name "Q_U_O_T_A_T_I_O_N" is set. In this case, it is desirable that a delimiter should not be inserted between character recognition results, but the technique of Japanese Patent Laid-Open No. 2008-176624 cannot cope with this case.

The present invention has been made to solve the above problem, and an object of the present invention is to use character recognition results of a scan image and allow a user to set a file name and the like for the scan image with simple operation.

SUMMARY OF THE INVENTION

According to the present invention, there is provided an apparatus for performing a predetermined process on a scan image obtained by scanning a document, including: a display control unit configured to display a UI screen for performing the predetermined process, the UI screen displaying a character area in the scan image in a selectable manner to a user; and a setting unit configured to perform OCR processing on a character area selected by a user via the UI screen and set supplementary information for the predetermined process by using a character string extracted in the OCR processing, wherein, in a case where a user selects a plurality of character areas, the setting unit determines whether a delimiter should be inserted between the extracted character strings based on a positional relation between the plurality of selected character areas and, if it is determined that a delimiter should be inserted, inserts a delimiter between the extracted character strings.

Further features of the present invention will become apparent from the following description of exemplary embodiments with reference to the attached drawings.

BRIEF DESCRIPTION OF THE DRAWINGS

FIG. 3A is a diagram illustrating a hardware configuration of a MFP;

FIG. 3B is a diagram illustrating a hardware configuration of a file server;

FIG. 7A and FIG. 7B show examples of a preview screen;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

<Configuration of an Image Processing System>

Figure 1:
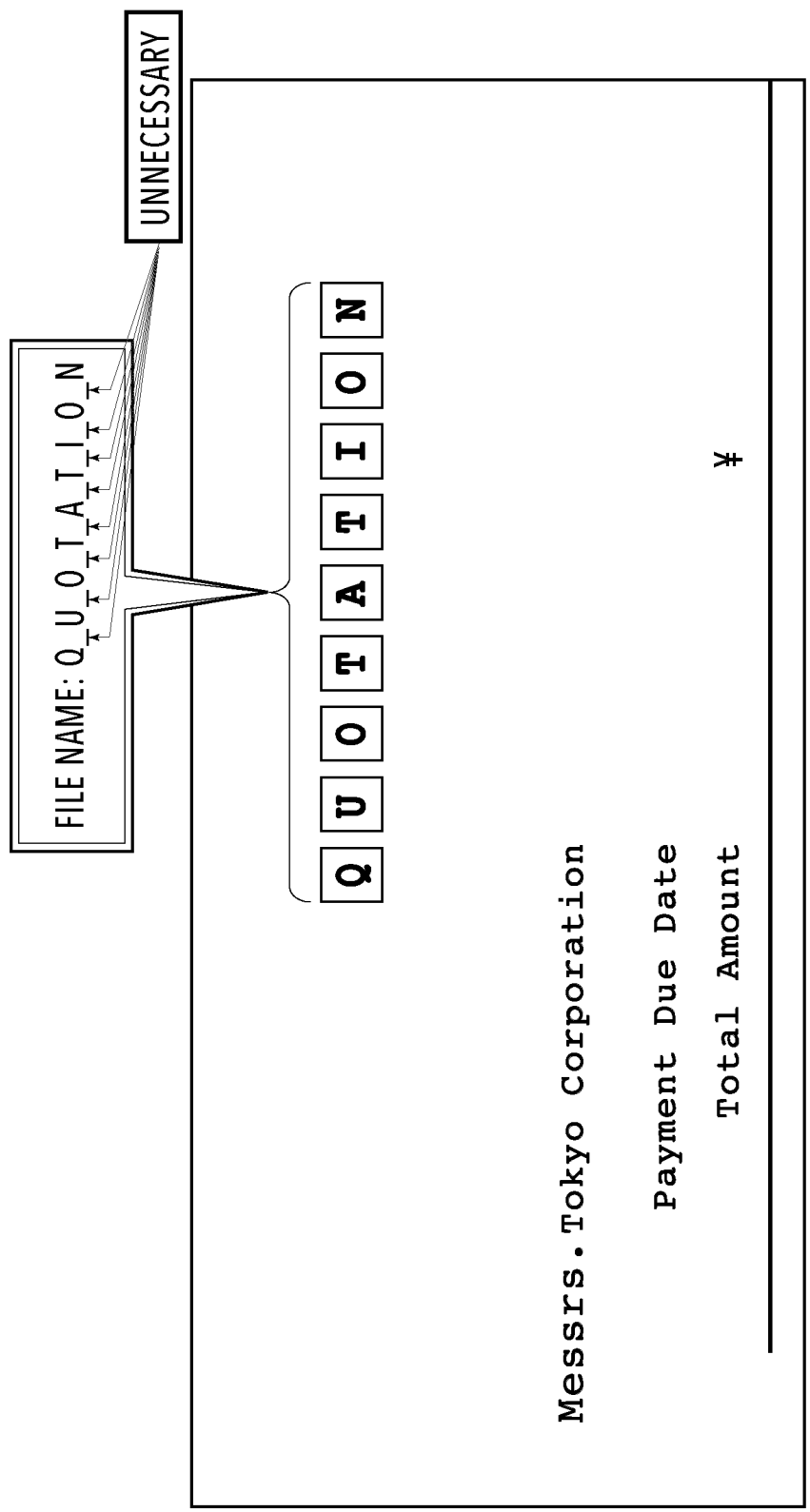
FIG. 1 is a diagram illustrating a problem of the prior art.
Figure 2:
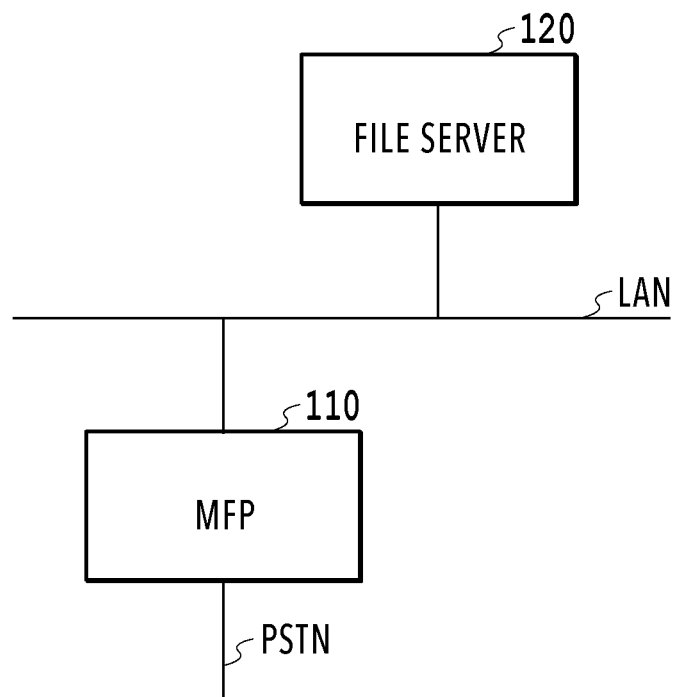
FIG. 2 is a diagram illustrating an entire configuration of an image processing system.

FIG. 2 is a diagram illustrating an entire configuration of an image processing system according to the present embodiment. The image processing system is composed of a MFP 110 and a file server 120, which are connected to each other via a LAN (Local Area Network) for communication.

The MFP (Multi Function Printer) 110 is multifunction equipment having a plurality of functions such as a scanner and a printer, and is an example of an image processing apparatus. The file server 120 is an example of an external server that stores and manages a digitized document file. The image processing system of the present embodiment is composed of the MFP 110 and the file server 120, but is not limited to this. For instance, the MFP 110 may also serve as the file server 120. Further, a connection form via, for example, the Internet, instead of the LAN, may be employed. Furthermore, the MFP 110 is connected to PSTN (Public Switched Telephone Networks) and can transmit and receive image data via facsimile to and from a facsimile machine (not shown).

FIG. 3A is a diagram of a hardware configuration of the MFP 110. The MFP 110 is composed of a control unit 210, an operating unit 220, a printer unit 221, a scanner unit 222, and a modem 223. The control unit 210 is composed of the following units 211 to 219 to control the entire operation of the MFP 110. A CPU 211 loads a control program stored in a ROM 212 and executes and controls the various functions of the MFP 110 such as scanning, printing, and communication. A RAM 213 is used as a main memory of the CPU 211 or a temporary storage area such as a work area. It should be noted that in the present embodiment, one CPU 211 uses one memory (RAM 213 or HDD 214) to perform each process shown in the flowchart as will be described later, but the present invention is not limited to this. For example, a plurality of CPUs may perform processes with a plurality of RAMs or HDDs working together. The HDD 214 is a large capacity storage unit for storing image data and various programs. An operating unit I/F 215 is an interface connecting the operating unit 220 and the control unit 210. The operating unit 220 has a touch panel, a keyboard, and the like and receives an operation, input, and instruction by a user. A printer I/F 216 is an interface connecting the printer unit 221 and the control unit 210. Image data for printing is transferred from the control unit 210 to the printer unit 221 via the printer I/F 216 and printed on a print medium. A scanner I/F 217 is an interface connecting the scanner unit 222 and the control unit 210. The scanner unit 222 scans a document set on a platen or ADF (Auto Document Feeder) (not shown) to generate image data and inputs to the control unit 210 via the scanner I/F 217. The MFP 110 can not only print output (copy) the image data generated by the scanner unit 222 from the printer unit 221 but also transmit a file of the image data or transmit the image data via email. A modem I/F 218 is an interface connecting the modem 223 and the control unit 210. The modem 223 transmits and receives image data via facsimile to and from a facsimile machine over PSTN. A network I/F 219 is an interface connecting the control unit 210 (the MFP 110) to the LAN. The MFP 110 transmits image data and information and receives various types of information to and from an external apparatus (e.g., the file server 120) on the LAN by using the network I/F 219.

FIG. 3B is a diagram of a hardware configuration of the file server 120. The file server 120 is composed of a CPU 311, a ROM 312, a RAM 313, a HDD 314, and a network I/F 315. The CPU 311 loads control programs stored in the ROM 312 and performs various processes to control the entire operation of the file server 120. The RAM 313 is used as a main memory of the CPU 311 or a temporary storage area such as a work area. The HDD 314 is a large capacity storage unit for storing image data and various programs. The network I/F 315 is an interface connecting the file server 120 to the LAN. The file server 120 transmits and receives various types of information to and from other apparatuses (e.g., the MFP 110) on the LAN by using the network I/F 315.

<Software Configuration of the MFP>

Figure 4:
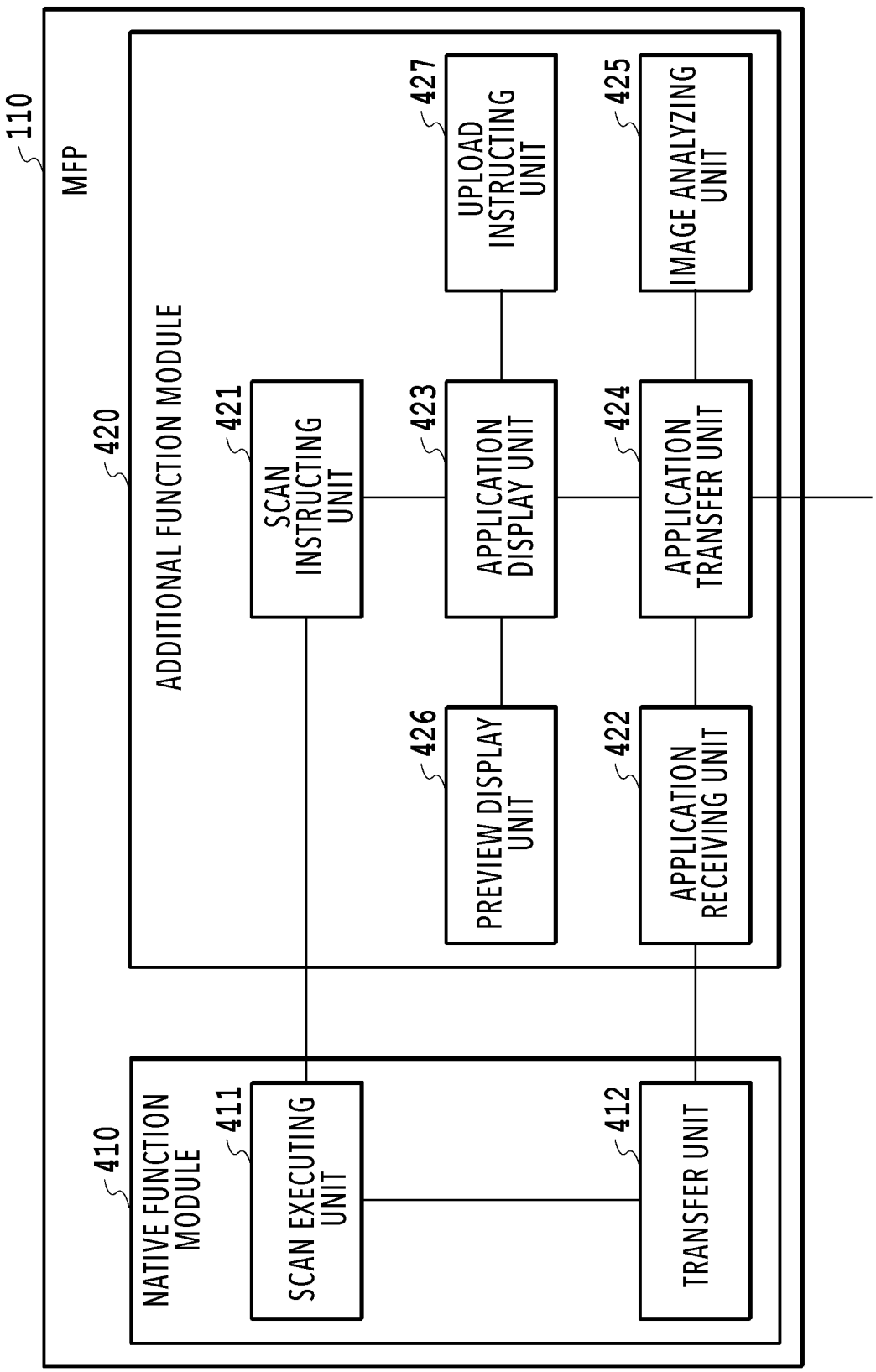
FIG. 4 is a diagram illustrating a software configuration of the MFP.

FIG. 4 is a diagram of a software configuration of the MFP 110. Software of the MFP 110 is roughly divided into two: a native function module 410 and an additional function module 420. Units included in the native function module 410 are function modules basically provided in the MFP 110. Meanwhile, units included in the additional function module 420 are function modules additionally provided in the MFP 110, such as a function module realized by installation of an application. The additional function module 420 of the present embodiment is a Java (registered trademark) based application and can easily realize addition of functions to the MFP 110. Incidentally, other applications (not shown) may be installed in the MFP 110. The units forming both function modules 410 and 420 will be described below.

An application display unit 423 performs display control to display a UI screen for receiving various types of operation by a user on a touch panel of the operating unit 220. The UI screen to be displayed will be described later in detail. A scan instructing unit 421 transmits a scan request including scan setting information and transfer setting information to a scan executing unit 411 in response to a user instruction inputted via the UI screen and causes the scan executing unit 411 to perform a scan process. The scan request also includes a request ID for identifying whether image data received by an application receiving unit 422, which will be described later, corresponds to the scan request.

If the scan request is received from the scan instructing unit 421, the scan executing unit 411 controls the scanner unit 222 via the scanner I/F 217 to perform the scan process. Accordingly, a document is scanned and image data is generated. The image data generated by scanning (hereinafter referred to as "scan image data") is passed to a transfer unit 412 together with the transfer setting information that specifies a destination of the image data. The transfer unit 412 transfers the scan image data received from the scan executing unit 411 according to the transfer settings. For the destination of the scan image data, the file server 120, a PC (not shown) on the LAN, or the like can be set. However, in the present embodiment, all of the scan image data generated by the scan executing unit 411 is supposed to be once transferred to the additional function module 420. The transfer unit 412 has a FTP (File Transfer Protocol) client function and transfers the scan image data by using a FTP to the application receiving unit 422 having a FTP server function.

The application receiving unit 422 receives the scan image data internally transferred from the transfer unit 412 and passes it to an application transfer unit 424. The application transfer unit 424 passes the received scan image data to an image analyzing unit 425. The image analyzing unit 425 performs an image analysis process on the received scan image data, such as specifying a character area and character recognition. Then, the scan image data and its analysis result are passed to a preview display unit 426 via the application transfer unit 424. Based on the scan image data and its analysis result, the preview display unit 426 generates a UI screen for a user to set a file name and performs display control such as displaying on a liquid crystal panel of the operating unit 220.

An upload instructing unit 427 generates a UI screen for a user to set a folder path and displays it on the touch panel of the operating unit 220. The application transfer unit 424 transfers (transmits) the scan image data to the file server 120. If the transfer is finished, the application transfer unit 424 notifies the application display unit 423 that the transfer has been finished. If the notification is received from the application transfer unit 424, the application display unit 423 updates a display content. Further, the application transfer unit 424 has a SMB (Server Message Block) client function. Accordingly, file operation and folder operation are performed with respect to the file server 120 having a SMB server function by using a SMB. It should be noted that a protocol to be used is not limited to the SMB. WebDAV, FTP, SMTP, or the like may be used. Furthermore, a protocol other than the protocol used for the purpose of file transmission such as SOAP or REST may be used.

Figure 5:
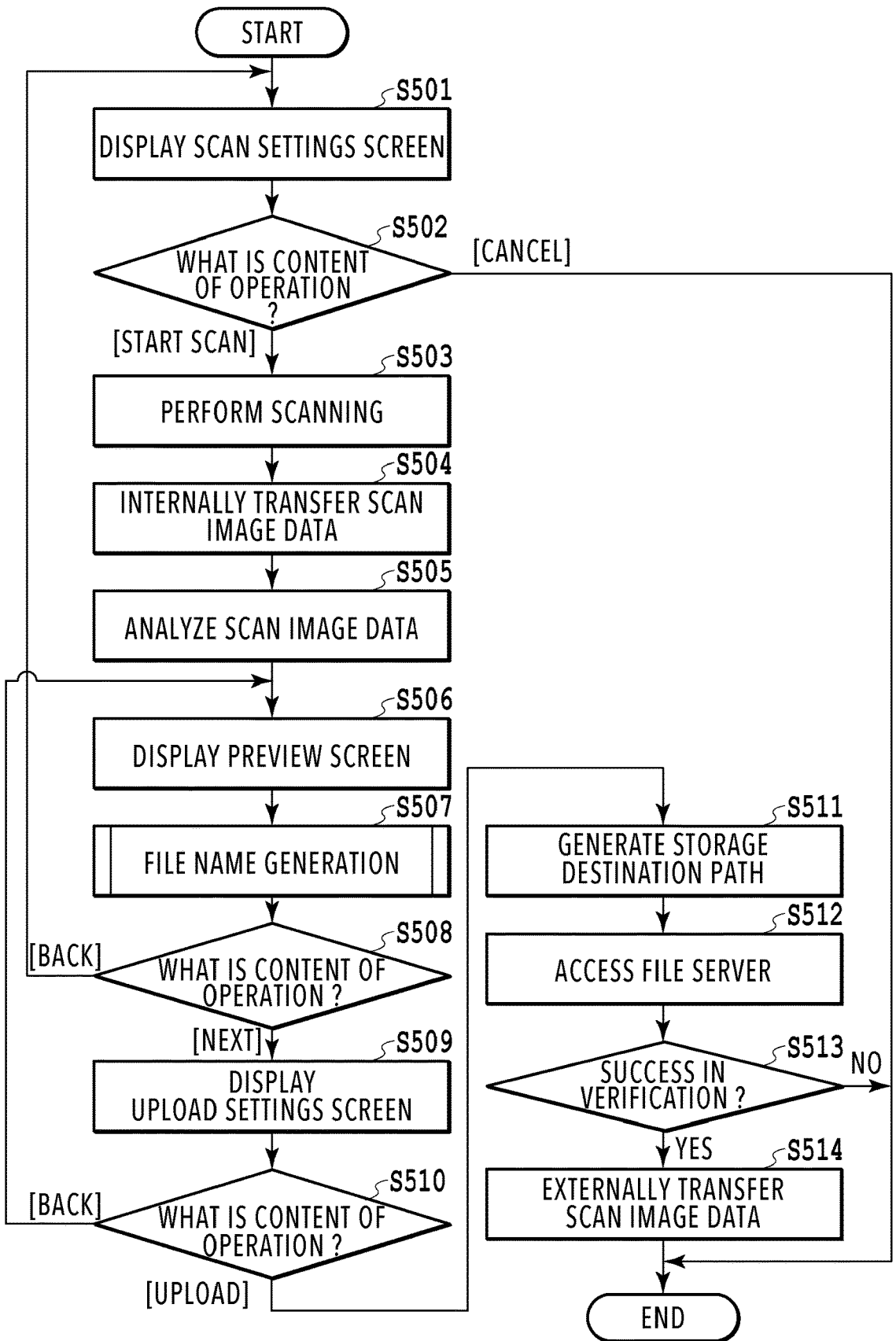
FIG. 5 is a flowchart illustrating a flow of operation control from generation to upload of a scan image.

Next, operation control in the MFP 110 in generating a scan image from a document and uploading it to the file server 120 will be described. FIG. 5 is a flowchart showing a flow of control from generation to upload of a scan image. The series of processes can be realized by the CPU 211 executing control programs stored in the HDD 214 in the control unit 210. Detailed description will be given below.

Figure 6:
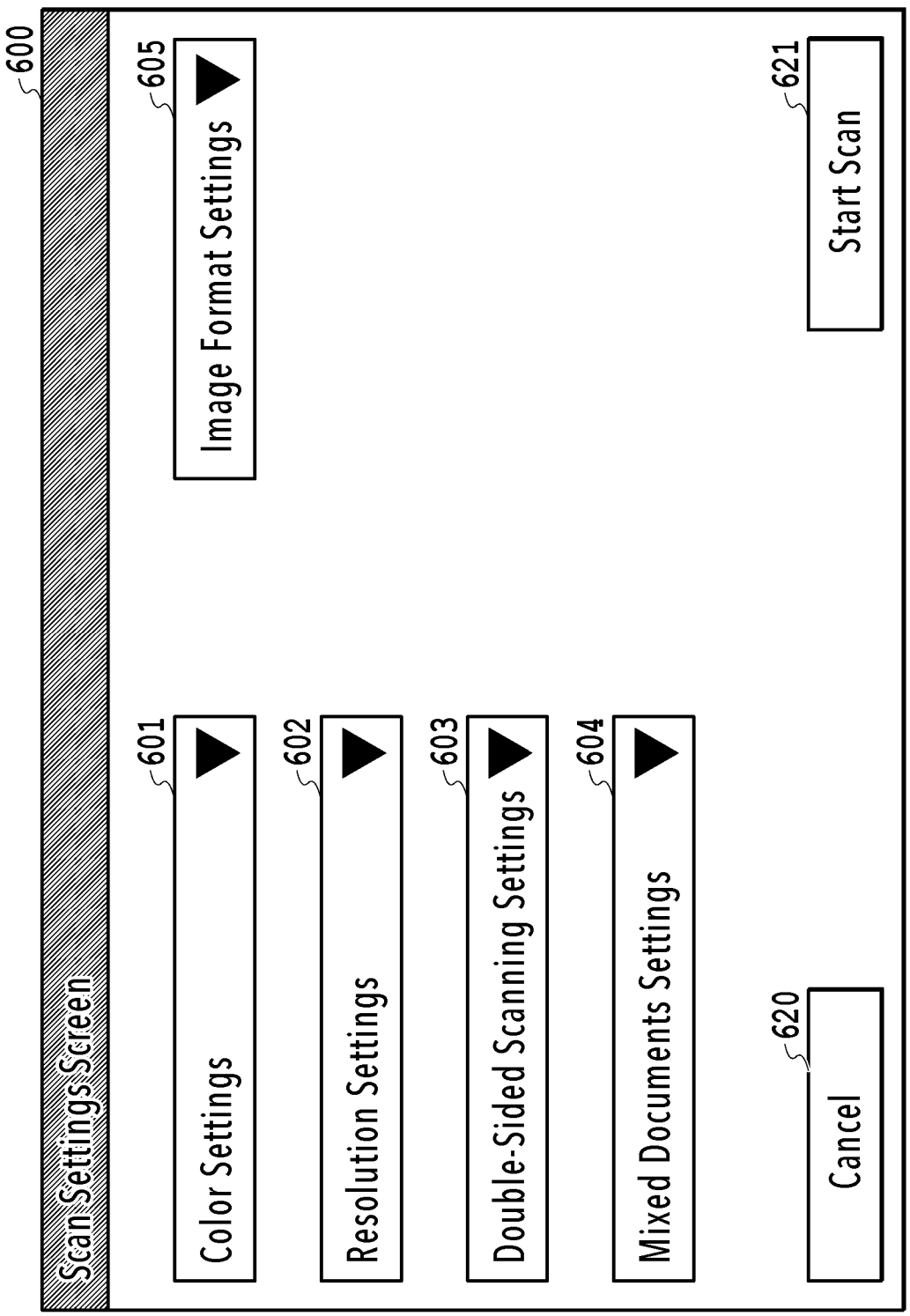
FIG. 6 shows an example of a scan settings screen.

In step 501, a UI screen (hereinafter referred to as a "scan settings screen") for making various settings for a scan process is displayed by the application display unit 423 on the touch panel of the operating unit 220. FIG. 6 shows an example of a scan settings screen. A scan settings screen 600 of FIG. 6 has five settings buttons 601 to 605. A [Color Settings] button 601 is a button for setting color/monochrome in scanning a document. A [Resolution Settings] button 602 is a button for setting a resolution in scanning a document. A [Double-Sided Scanning Settings] button 603 is a settings button used in need of scanning two sides of a document. A [Mixed Documents Settings] button 604 is a settings button used in need of scanning documents in different sizes at one time. An [Image Format Settings] button 605 is a settings button used in specifying a saving format of scan image data. In making settings using these settings buttons 601 to 605, candidates (options) that can be set within a range supported in the MFP 110 are displayed, and a user selects desired settings from the displayed candidates. It should be noted that the above settings buttons are described as examples. Not all of these setting items should be included, and setting items other than these setting items may be included. The user makes detailed settings relating to the scan process via the scan settings screen 600. A [Cancel] button 620 is a button used in stopping scan settings. A [Start Scan] button 621 is a button for instructing start of a scan process on a document set on a platen or the like.

In step 502, by the application display unit 423, processes are separated according to the contents of button operation by the user. In a case where pressing of the [Start Scan] button 621 is detected, the contents set by the settings buttons 601 to 605 and the receipt of starting the scan process are notified to the scan instructing unit 421 by the application display unit 423. Meanwhile, in a case where pressing of the [Cancel] button 620 is detected, the present process is finished.

In step 503, in response to an instruction from the scan instructing unit 421, the scan process is performed by the scan executing unit 411. In step 504, the thus obtained scan image data is internally transferred using the FTP to the application receiving unit 422 through the transfer unit 412, and further transmitted to the image analyzing unit 425 via the application transfer unit 424.

In step 505, in the image analyzing unit 425, an analysis process for the scan image data is performed. More specifically, first, with respect to the scan image data, binarization of image signals, correction of inclination of the document displaced in scanning, turning of the document in a positionally-correct direction, and the like are performed to correct the state of the scan image data so that the analysis process is smoothly performed. Then, edge extraction or the like is performed on the corrected scan image (binary image) to specify a character area in the image, that is, a block (unit area) assumed to be one continuous character string. Table 1 below shows an example of results of an image analysis process performed on a portion of a scan image of a given quotation.

TABLE 1

| No. | X Coordinate of Area | Y Coordinate of Area | Area Width | Area Height |
|---|---|---|---|---|
| 1 | 40 | 5 | 5 | 5 |
| 2 | 45 | 5 | 5 | 5 |
| 3 | 50 | 5 | 5 | 5 |
| 4 | 55 | 5 | 5 | 5 |
| 5 | 60 | 5 | 5 | 5 |
| 6 | 65 | 5 | 5 | 5 |
| 7 | 70 | 5 | 5 | 5 |
| 8 | 75 | 5 | 5 | 5 |
| 9 | 80 | 5 | 5 | 5 |
| 10 | 38 | 20 | 10 | 5 |
| 11 | 5 | 20 | 30 | 5 |
| 12 | 78 | 20 | 30 | 5 |
| 13 | 78 | 28 | 18 | 5 |
| 14 | 5 | 35 | 23 | 5 |
| 15 | 5 | 45 | 33 | 5 |
| 16 | 75 | 40 | 30 | 5 |
| 17 | 75 | 50 | 43 | 5 |

In the above Table 1, [No.] indicates a unique number of each specified character area. In this example, serial numbers 1 to 17 are put in order of recognition. [X Coordinate of Area] indicates the X coordinate of the upper left corner of each specified character area. [Y Coordinate of Area] indicates the Y coordinate of the upper left corner of each specified character area. Hereinafter, in using the term "coordinate(s)" for a character area, the term refers to position coordinates of the upper left corner of a character area unless otherwise specified. [Area Width] indicates a distance between the left side and the right side of each specified character area. [Area Height] indicates a distance between the upper side and the lower side of each specified character area. In the present embodiment, [X Coordinate of Area], [Y Coordinate of Area], [Area Width], and [Area Height] are all represented by pixels, but they may also be represented by points, inches, or the like. Information on each character area extracted from the scan image (hereinafter referred to as "character area information") is passed to the application transfer unit 424 as image analysis data. The image analysis data is in a CSV or XML format, for example, but may be in other formats. Further, the image analysis data may be passed at a predetermined timing after temporarily stored in the HDD 214.

In step 506, the scan image obtained in step 503 is preview displayed by the preview display unit 426 on the touch panel of the operating unit 220. Screen data for the preview display is generated and provided by the application display unit 423. The user can set a file name of the scan image data via the UI screen (hereinafter referred to as a "preview screen") in which a scan image is preview displayed. FIG. 7A shows an example of a preview screen. In a preview screen 700, the obtained scan image is displayed in a preview area 710 located in the center of the screen. Further, in the preview area 710, together with the scan image, a plurality of buttons 711 to 714 are also displayed for changing a display state of the scan image. The buttons

Figure 7B:
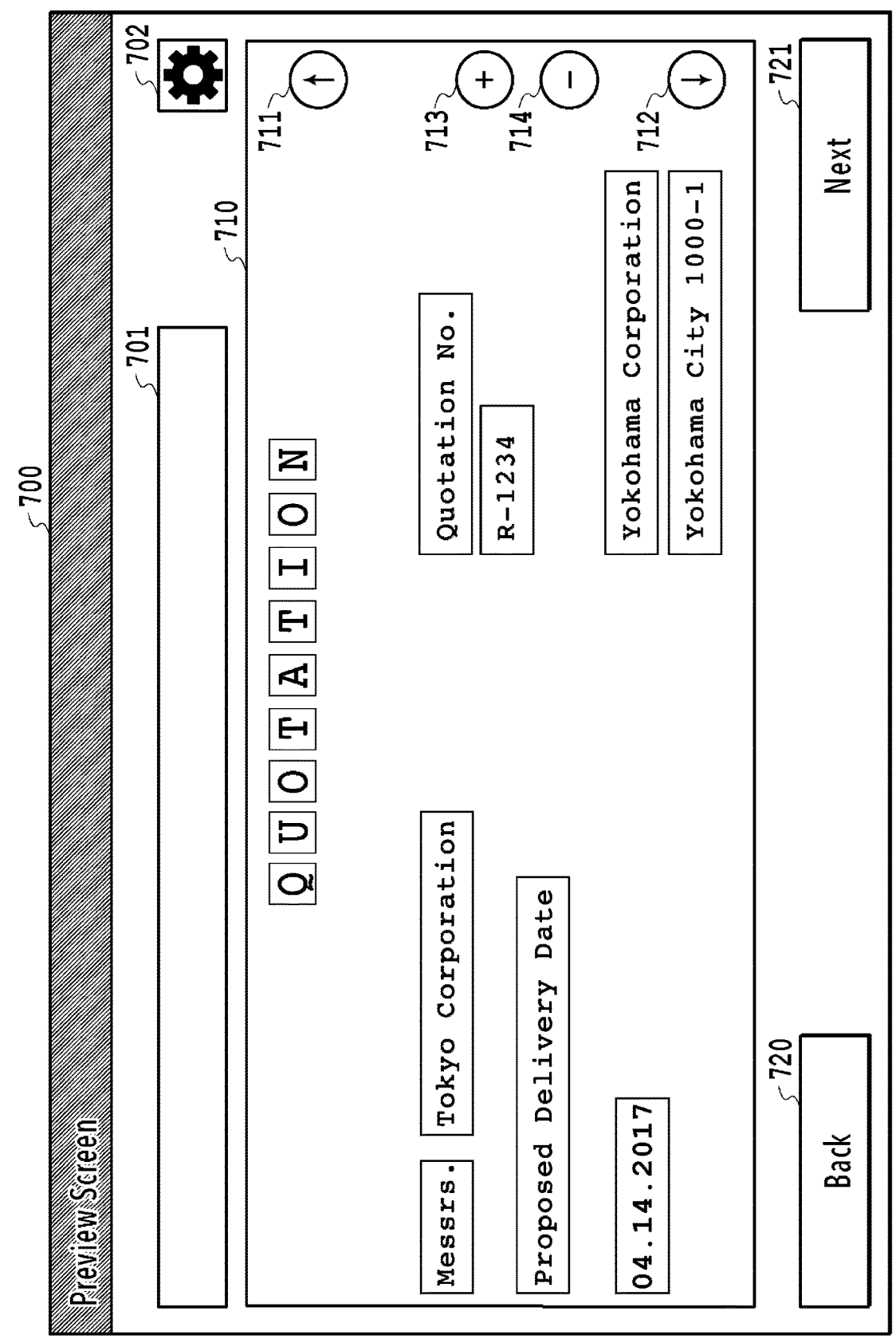

711 and 712 appear when the entire scan image cannot be displayed and are used for scrolling the display area in a vertical direction. Usually, the size of the touch panel provided in the MFP 110 is not that large. Accordingly, for example, in a case where the scan image is obtained by scanning a document in A4-size, portrait, with horizontal writing, an initial setting is made so that the scan image is top-aligned, scaled-down, and displayed with its entire width direction (lateral direction) just fitted into the preview area 710. That is, in the initial setting, a lower part of the A4-size, portrait scan image is not displayed within the preview area 710. In this case, by pressing the "↓" button 712, the display area is scrolled down and the lower part can be displayed. Furthermore, in a case where the scan image is A4-size landscape, A3-size, or the like, a button for scrolling the display area in a horizontal direction may further be provided. The buttons 713 and 714 are buttons for the scaling of the display area. Pressing the "+" button 713 allows zooming in, and pressing the "−" button 714 allows zooming out. Actions by the button operation may be realized by operation with user's fingers, such as swipe, pinch in/pinch out on the preview screen. In the preview area 710, a character area specified in the image analysis process in step 505 is displayed in a recognizable manner to the user based on the above-described character area information. FIG. 7B shows a state where each character area is displayed in a recognizable manner by a box in the preview screen 700 shown in FIG. 7A, and character areas correspond to the above Table 1. If the user selects (e.g., touches with a finger) any character area from the character areas displayed in the preview area 710, a character string included in the character area is displayed, that is, automatically inputted, in a file name input field 701 and becomes part of character strings forming a file name. A [Back] button 720 is a button used in stopping preview display. A [Next] button 721 is a button for moving to a screen in which an upload destination of the obtained scan image data is set. Further, a button 702 is a button for setting a format or the like of a file name. It should be noted that the above types of various buttons and aspects of display and selection of character areas are described as examples, and they are not limited to these examples. For instance, there may be buttons for correcting and changing character strings displayed in the file name input field 701 or for confirming a file name.

Figure 8:
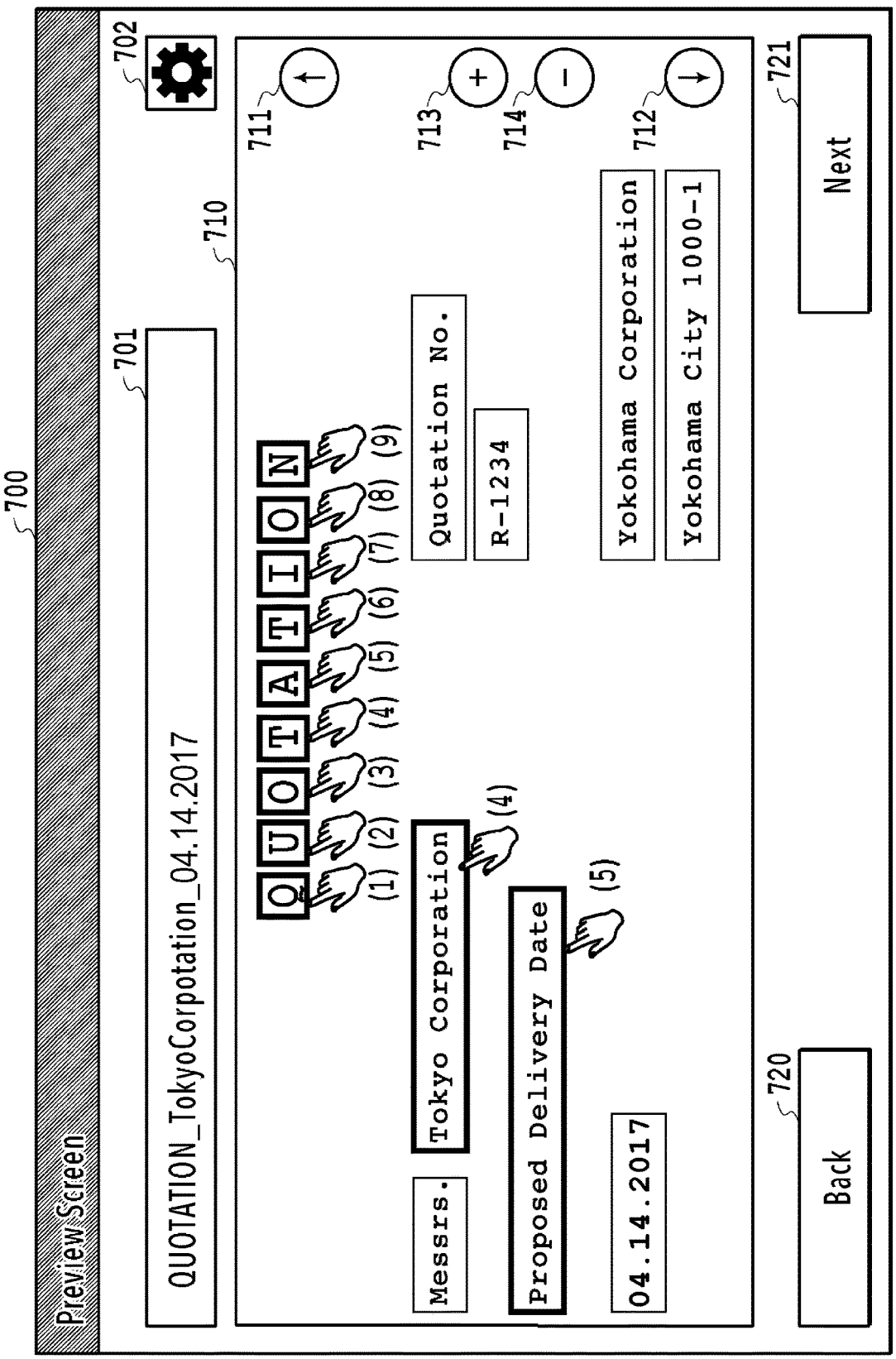
FIG. 8 shows a state where a file name is generated on the preview screen.

In step 507, a file name for the obtained scan image is generated by the preview display unit 426. FIG. 8 shows a state of the preview screen 700 after generating a file name. In this example, by sequentially selecting the character areas corresponding to "Q," "U," "0," "T," "A," "T," "I," "0," "N," "Tokyo Corporation," and "04.4.2017," the character string "QUOTATION_TokyoCorporation_04.14.2017" is displayed and set in the file name input field 701. Furthermore, in the preview area 710, boxes of the character areas touched by the user are changed to thick boxes to indicate that they are selected as part of the file name. Details of the file name generating process will be described later. After a desired file name is generated and the user presses the [Next] button 721, the process advances to step 508.

In step 508, like step 502, by the preview display unit 426, processes are separated according to the contents of button operation by the user. In a case where pressing of the [Next] button 721 is detected, information on a file name (a character string set as a file name) being displayed in the file name input field 701 is transmitted to the upload instructing unit 427, and the process advances to step 509. Meanwhile, in a case where pressing of the [Back] button 720 is detected, the process goes back to step 501 (display in the scan settings screen).

Figure 9:
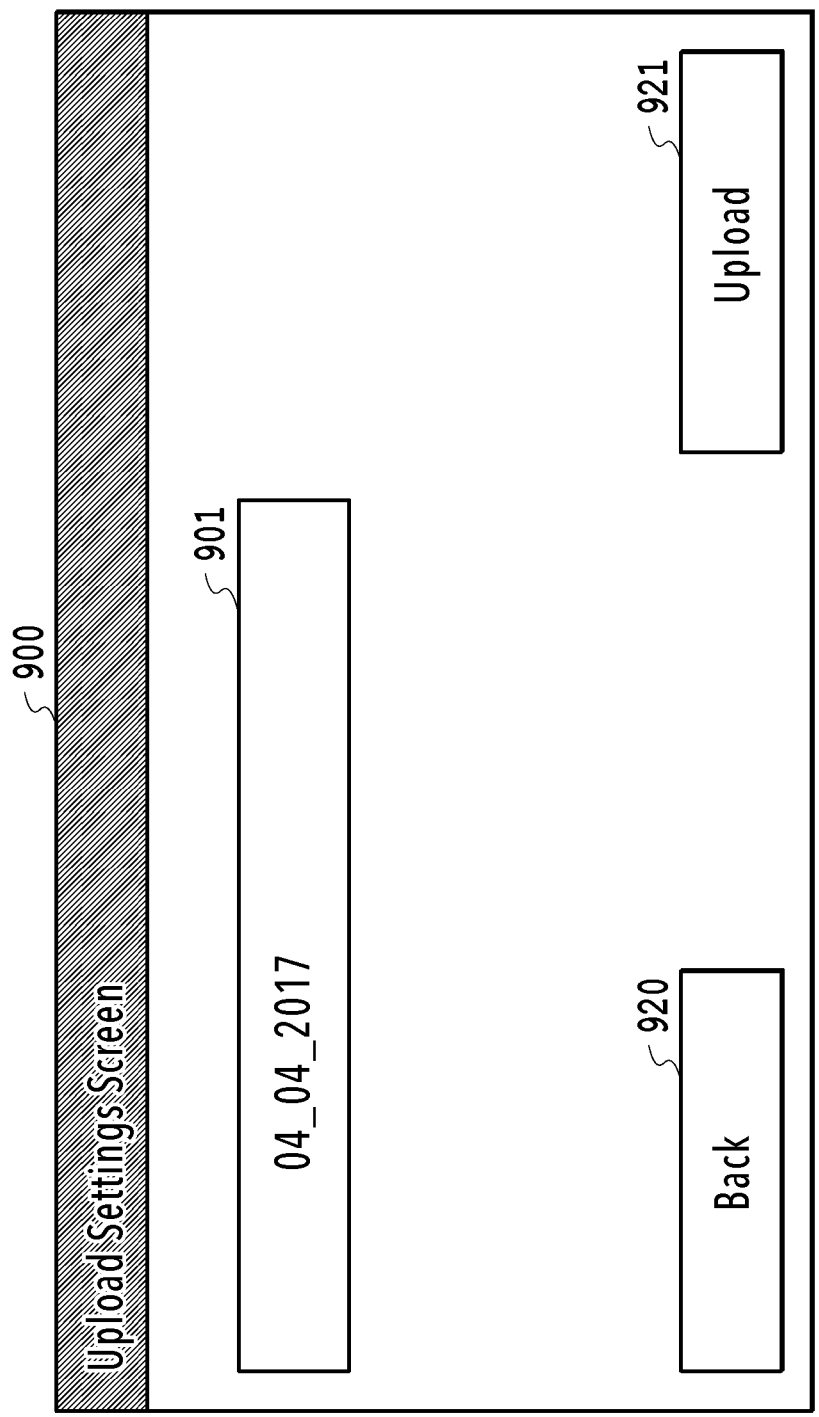
FIG. 9 shows an example of an upload screen.

In step 509, a UI screen (hereinafter referred to as an "upload settings screen") for setting a transfer destination of the scan image data is displayed by the upload instructing unit 427 on the touch panel of the operating unit 220. The user makes detailed settings relating to upload to the file server 120 via the upload settings screen. FIG. 9 shows an example of the upload settings screen. The user inputs, to a folder path input field 901, a name of a folder path (a path name) in external transfer to the file server 120. In the example of FIG. 9, "04_04_2017" is inputted as a path name. An example of the inputting method is a method for displaying a subwindow (not shown) of a keyboard screen in response to tapping on the folder path input field 901 and prompting the user to input a path name via the keyboard screen. Alternatively, a path name may be selected and set from an address book stored in the HDD 214. A [Back] button 920 is a button used in stopping detailed settings relating to upload. An [Upload] button 921 is a button for instructing upload to the folder path that is set in the folder path input field 901.

In step 510, like step 508, by the upload instructing unit 427, processes are separated according to the contents of button operation by the user. In a case where pressing of the [Upload] button 921 is detected, the process advances to step 511. At this time, a path name inputted to the folder path input field 901, a file name generated in step 507, and various types of information on file server settings are passed to the application transfer unit 424. Incidentally, the file server settings are necessary information for storing scan image data in the file server 120 and specifically include information such as a host name, a starting point of a folder path, and a user name and a password for login. Meanwhile, in a case where pressing of the [Back] button 920 is detected, the process goes back to step 506 (display in the preview screen).

In step 511, a storage destination path for the scan image data is generated by the application transfer unit 424 based on the information received from the upload instructing unit 427. More specifically, a storage destination path is generated by adding a folder path to the file server settings (a host name of the file server 120, a starting point of the folder path). Accordingly, a storage destination path, for example, "\\server01\Share\04_04_2017" is generated. Then, in step 512, access to the file server 120 is performed by the application transfer unit 424. At this time, a user name and a password included in the file server settings are transmitted to the file server 120. In the file server 120 that has received the user name and the password, a verification process is performed.

In step 513, by the application transfer unit 424, processes are separated according to the verification result in the file server 120. That is, in a case where a notification of success in verification is received from the file server 120, the process advances to step 514. Meanwhile, in a case where a notification of failure in verification is received, the present process is finished.

In step 514, the scan image data is externally transferred by the application transfer unit 424 to a folder indicated by the storage destination path generated in step 511 and stored in the file server 120.

The above description is the content of operation control from generation to upload of a scan image according to the present embodiment. It should be noted that in the present embodiment, it is assumed that the processes in step 505 to step 507 are performed on the image data corresponding to one page generated by scanning. For instance, a button for performing image analysis on the next page may be provided in the preview screen 700, and the next page obtained by the analysis may be preview displayed, so that character strings forming a file name can be set from character areas in the following pages.

<File Name Generation>

Figure 10:
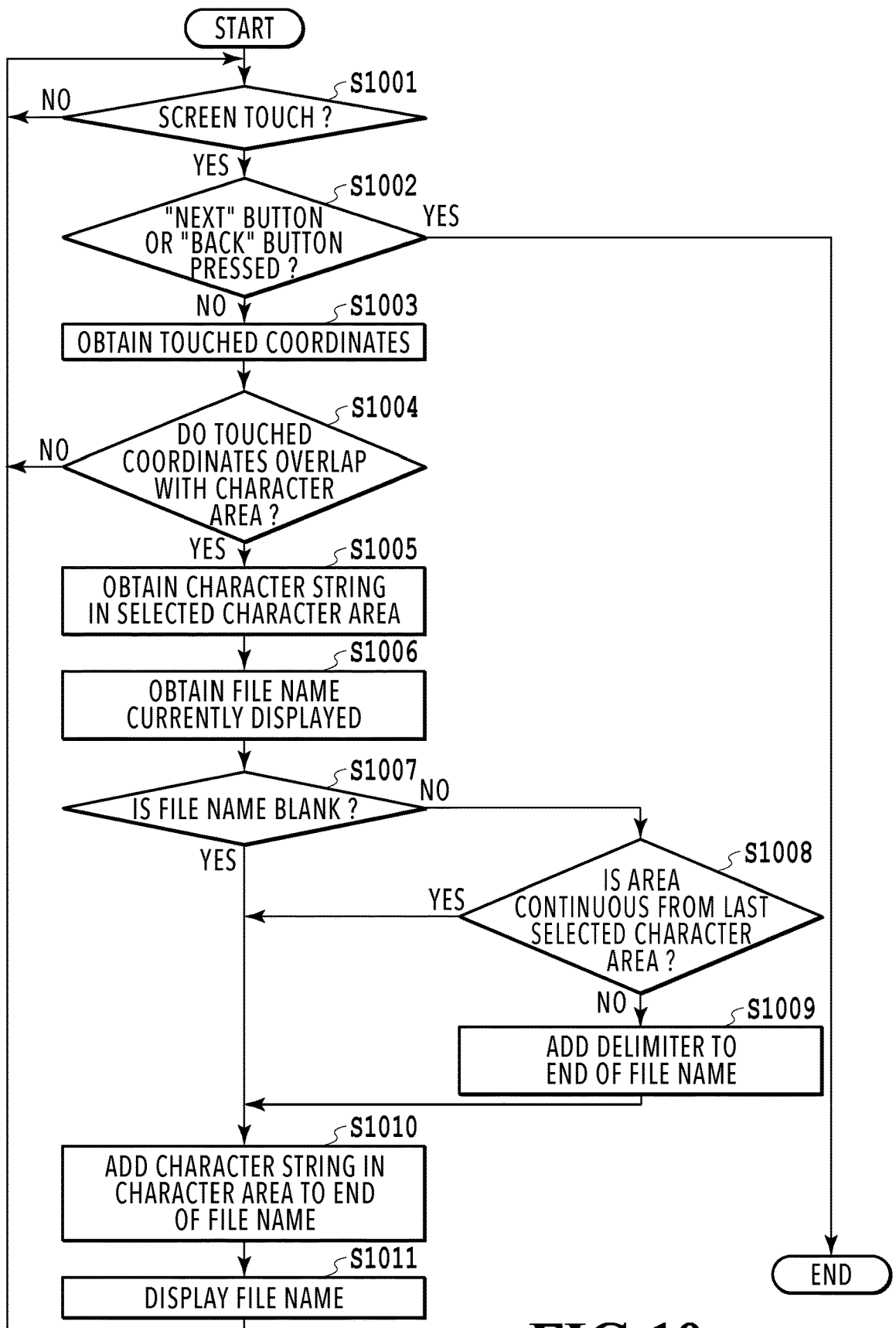
FIG. 10 is a flowchart illustrating details of a file name generating process according to a first embodiment.

FIG. 10 is a flowchart illustrating details of the file name generating process (step 507) in the preview display unit 426. Description will be given in accordance with the flow of FIG. 10.

In step 1001, presence or absence of touch operation by the user on the preview screen 700 displayed on the touch panel is monitored. If touch operation is detected, the process advances to step 1002. In the following step 1002, processes are separated according to the content of the touch operation. In a case where the content of the touch operation is pressing of the [Next] button 721 or the [Back] button 720, the present process is finished. In a case where the content of the touch operation is not pressing of the [Next] button 721 or the [Back] button 720, the process advances to step 1003.

In step 1003, position coordinates (x, y) on the touch panel on which the touch operation is performed are obtained. In the following step 1004, it is determined with which character area the position coordinates relating to the touch operation overlap. For example, determination is made based on whether the position coordinates relating to the touch operation are included within each character area displayed in the preview area 710 (within a rectangle specified by the position coordinates representing four corners of the character area). In a case where the position coordinates relating to the touch operation overlap with one of character areas, the process advances to step 1005. Meanwhile, in a case where the position coordinates relating to the touch operation overlap with none of character areas, the process goes back to step 1001.

In step 1005, a character string in the character area overlapping with the position coordinates relating to the touch operation is obtained. A character string is obtained by performing OCR processing on the character area selected by the touch operation (hereinafter referred to as a "selected character area") and extracting the character string by the image analyzing unit 425. Then in step 1006, a file name currently displayed in the file name input field 701 is obtained. In the following step 1007, it is determined whether a content of the obtained file name is "blank." The file name being "blank" as used herein means a blank field state where no character string is displayed in the file name input field 701. In a case where the obtained file name is "blank," the process advances to step 1010. Meanwhile, in a case where the obtained file name is not "blank," the process advances to step 1008.

In step 1008, based on a positional relation between a current selected character area and a last selected character area, it is determined whether both character areas are continuous in a specific direction. Since the text in common languages for horizontal writing (e.g., Japanese and English) runs from left to right, it is checked whether the character areas are continuous in the right direction (whether the current selected character area is on the right side of the last selected character area). As a matter of course, continuity in the vertical direction (in a downward direction) or in the left direction is checked depending on the format of the document or the language to be used. More specifically, under the following two conditions, it is checked whether character areas are continuous in a specific direction.

Both character areas have the same reference position (the Y coordinate of the upper left corner, in this example).

Both character areas are adjacent to each other (no character area exists therebetween). It should be noted that in comparing reference positions, reference positions with an error of about several pixels are determined to be the same in consideration of inclination or the like of the scan image. Furthermore, instead of comparing specific coordinates of the character areas, the position of a specific side (e.g., a bottom side) of the character area may be used as a reference for determination. Alternatively, a threshold process for comparing a distance between adjacent character areas with a predetermined threshold may be additionally performed, and only in a case where the distance is equal to or less than the threshold, both character areas are determined to be adjacent to each other. Any predetermined threshold may be used, but the predetermined threshold may be, for example, less than three times the height of the character area, preferably, about two times the height of the character area. As a result of determination, in a case where the current selected character area is on the right side of the last selected character area, the process advances to step 1010. Meanwhile, in a case where the current selected character area is not on the right side of the last selected character area, the process advances to step 1009. Incidentally, in the case of vertical writing instead of horizontal writing, it may be checked whether the current selected character area is on the lower side of the last selected character area under the above-described conditions.

In step 1009, a process is performed to add a predetermined delimiter to the end of the file name obtained in step 1006. An underscore will be described by way of example as a predetermined delimiter, but the predetermined delimiter is not limited to this. Symbols and characters other than the underscore, for example, a hyphen, may be used. Further, a space, which is not a visible character, may also be used.

In step 1010, the character string obtained in step 1005 (the character string extracted from the selected character area) is set as a constituent element of the file name. At this time, in a case where there is a character string that is already set, the character string obtained in step 1005 is added to the end of the character string that is already set. Then in step 1011, the character string(s) currently set is(are) displayed (automatically inputted) in the file name input field 701.

The above description is the content of the file name generating process. According to this process, only in a case where a plurality of character areas selected by the user are not continuous, a delimiter is inserted between the character recognition results of the character areas, and a file name of the scan image is generated.

Now, processes for generation of the file name "QUOTATION_TokyoCorporation_04.14.2017" shown in FIG. 8 will be described with reference to the above Table 1. First, serial numbers 1 to 17 in Table 1 are associated with the character areas as shown below.

1: "Q"
2: "U"
3: "O"
4: "T"
5: "A"
6: "T"
7: "I"
8: "O"

9: "N"
10: "Tokyo Corporation"
11: "Messrs."
12: "Quotation No."
13: "R-1234"
14: "Proposed Delivery Date"
15: "04.14.2017"
16: "Yokohama Corporation"
17: "Yokohama City 1000-1"

First, if touch operation on a character area of "Q" is detected, its coordinates and the character "Q" are obtained (step 1001 to step 1006). The file name input field 701 at this stage has no character string displayed and is in a "blank" state (Yes in step 1007), and thus "Q" is displayed in the file name input field 701 (step 1011). In the preview area 710, to indicate that "Q" is selected as part of the file name according to the touch operation by the user, the box of the character area of "Q" is changed to a thick box.

Next, if touch operation on a character area of "U" is detected, its coordinates and the character "U" are obtained (step 1001 to step 1006). The file name input field 701 at this stage has the character "Q" displayed and is not "blank" (No in step 1007). Accordingly, it is determined whether the character area of "U" currently selected and the character area of "Q" relating to the last selection are adjacent to each other under the above-described two conditions (step 1008). First, the Y coordinate of both character areas is "5" (see Table 1). Thus, the first condition is satisfied. Next, the second condition is checked by sorting all of the character areas on the Y coordinate "5" according to the X coordinate and determining whether the last selected character area and the current selected character area are adjacent to each other in the order after sorting. Now, on the Y coordinate of the character area of "Q," there are the character area of "U" and the character area of "O." By sorting these three character areas according to the X coordinate in ascending order, "Q," "U," and "O" align laterally in this order, and the last selected character area and the current selected character area are adjacent to each other (Yes in step 1008). Accordingly, the character "U" is added to the file name input field 701, next to the character "Q" (step 1010). At this point, the file name is "QU." Then, in response to the touch operation on the character area, the same process is performed, and the character "O" is added to the file name input field 701, next to the character "U" (step 1010). The same process is also performed on character areas of "T," "A," "T," "I," "O," and "N." At this point, the file name is "QUOTATION." Further, in the preview area 710, like the character area of "Q," the boxes of the character areas of "U," "O," "T," "A," "T," "I," "O," and "N" are changed to thick boxes.

Next, if touch operation on a character area of "Tokyo Corporation" is detected, its coordinates and the characters "Tokyo Corporation" are obtained (step 1001 to step 1006). In this case, the character area of "Tokyo Corporation" currently selected and the character area of "N" relating to the last selection are not adjacent to each other (No in step 1008). Accordingly, an underscore "_" which is a delimiter is additionally set to the file name input field 701, next to the characters "QUOTATION" (step 1009). At this point, the file name is "QUOTATION_." After that, the characters "Tokyo-Corporation" are further added (step 1010), and the file name becomes "QUOTATION_TokyoCorporation." Then, if touch operation by the user on a character area of "04.4.2017" is detected, its coordinates and the characters "04.4.2017" are obtained (step 1001 to step 1006). The character area of "04.4.2017" currently selected and the character area of "Tokyo Corporation" relating to the last selection are not adjacent to each other (No in step 1008). Accordingly, an underscore "_" which is a delimiter is additionally set to the file name input field 701, next to the characters "TokyoCorporation" (step 1009). At this point, the file name is "QUOTATION_TokyoCorporation_." After that, the characters "04.4.2017" are further added (step 1010), and finally, the file name "QUOTATION_TokyoCorporation_04.14.2017" is obtained. Further, in the preview area 710, like the character areas of "Q," "U," "O," "T," "A," "T," "I," "O," and "N," the boxes of "Tokyo Corporation" and "04.4.2017" are changed to thick boxes.

The above description is the content of the file name generating process. In the present embodiment, description has been given of an example of a situation of setting a file name by using character recognition results of the character areas in the scan image. However, the scope of application of the present invention is not limited to the situation of setting a file name. For example, the file name generating process is applicable to data transfer destination settings such as an upload destination of a scan image or destination settings in FAX transmission or email transmission. In this case, for example, in the above-described upload settings screen 900 shown in FIG. 9, character recognition results of character areas in a scan image may be optionally displayed as candidates for a folder path so that a path name can be set according to user selection. Furthermore, in a destination setting screen (not shown), character recognition results of character areas in a scan image may be optionally displayed as candidates for a FAX number or email address so that a FAX number or email address can be set according to user selection. In this manner, in a situation other than the file name setting, for example, in a situation of setting various types of information relating to a scan image (supplementary information), such as setting a data transfer destination or the like, the present invention is widely applicable.

As described above, according to the present embodiment, by sequentially selecting character areas in a scan image, the user can simply set a file name and the like having a delimiter inserted in an appropriate position.

Second Embodiment

Next, as a second embodiment, description will be given of an aspect that in a case where constituent characters of a word desired to be given to a file name and the like are separated into a plurality of character areas, the character areas are automatically selected as one continuous string of characters without requiring a user to select every character area one by one. It should be noted that description will be omitted of the content common to the first embodiment such as the flow of scan operation control in the MFP 110. Hereinafter, a file name generating process which is a feature of the present embodiment will be mainly described.

Figure 11:
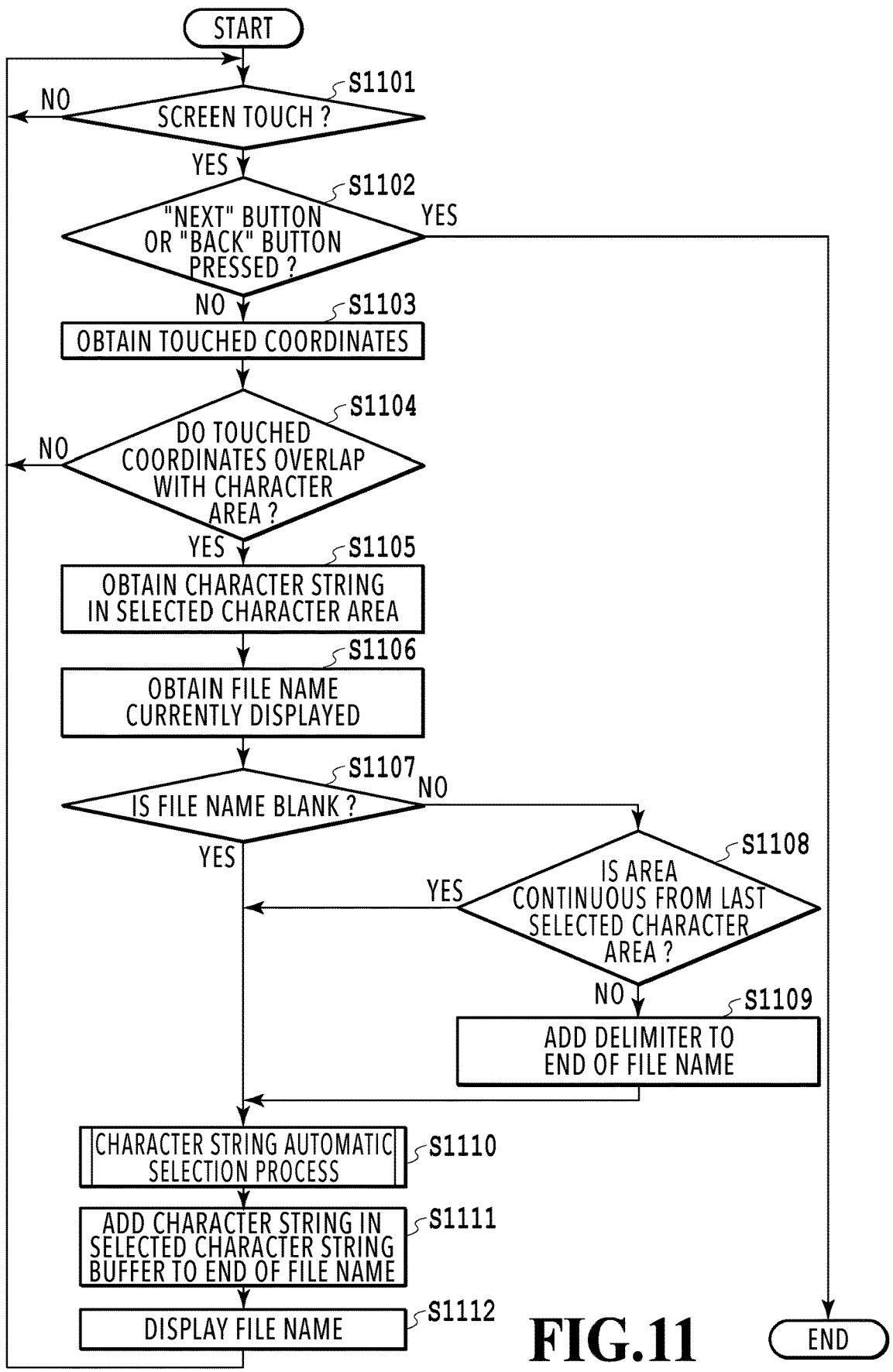
FIG. 11 is a flowchart illustrating details of a file name generating process according to a second embodiment.
Figure 12:
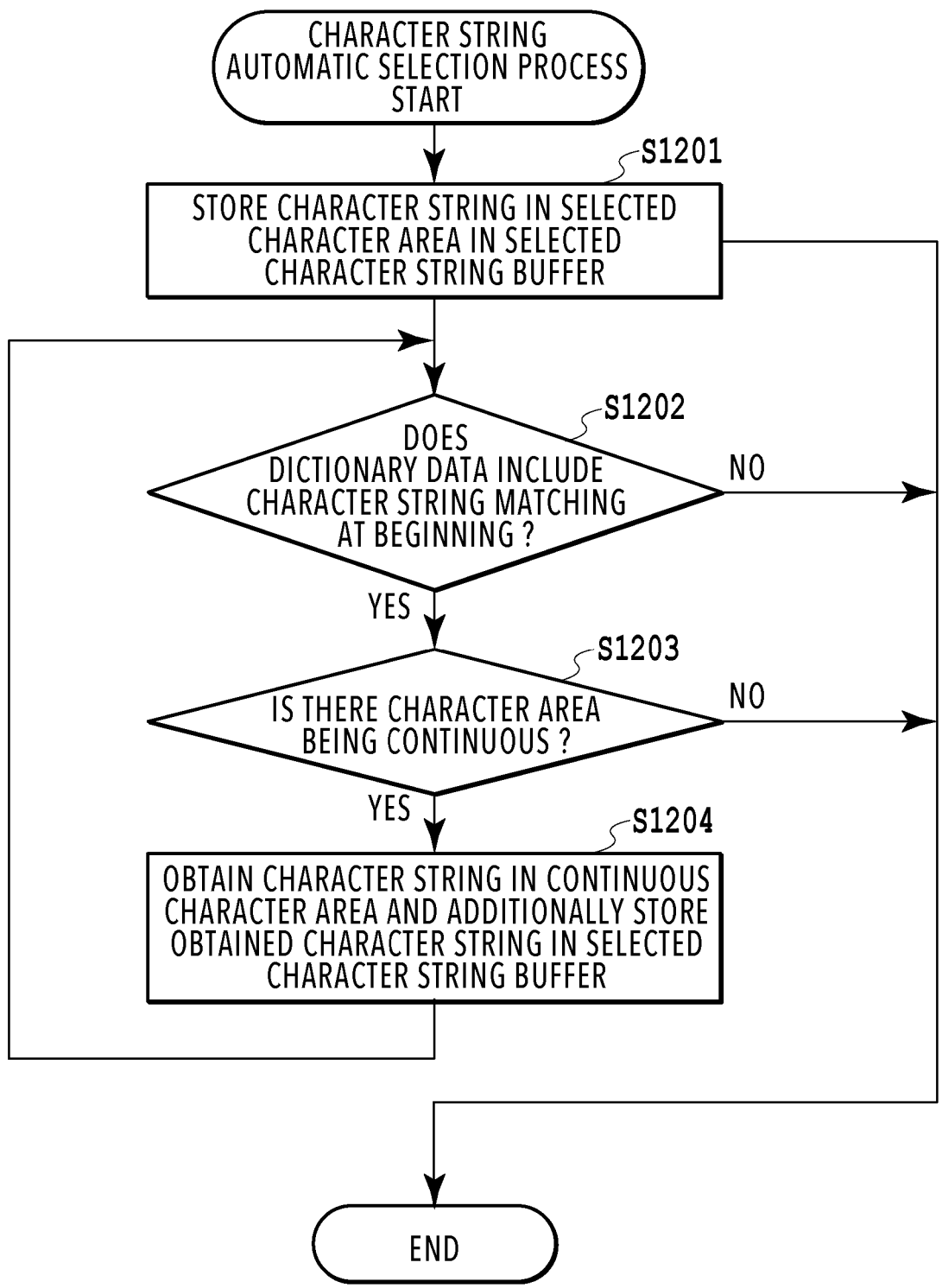
FIG. 12 is a flowchart illustrating details of a process of automatically selecting a character string in a continuous character area.

FIG. 11 is a flowchart illustrating details of the file name generating process by the preview display unit 426 according to the present embodiment. The processes in step 1101 to step 1109 are the same as those in step 1001 to step 1009 in the flow of FIG. 10 of the first embodiment. Differences from the flow of FIG. 10 are a process after a file name is determined to be "blank" (Yes in step 1107) and a process after a delimiter is added (step 1109). That is, in step 1110, the preview display unit 426 performs a process for automatically selecting a character string in a character area determined to be continuous from the character area currently selected, as a character string forming a file name. FIG. 12 is a flowchart illustrating details of a process of automatically selecting a character string in a continuous character area. Hereinafter, description will be given in accordance with the flow of FIG. 12.

In step 1201, a character string extracted from the current selected character area is stored in a dedicated buffer (hereinafter referred to as a "selected character string buffer"). In the following step 1202, with reference to dictionary data prepared beforehand, it is determined whether the dictionary data includes a word matching with the beginning of the character string stored in the selected character string buffer. In this case, it is assumed that the dictionary data is stored in advance in the additional function module 420, for example. The dictionary data is composed of, for example, a glossary of common words or an original glossary generated by registering desired words in advance by a user, or history information storing character strings used for file names by a user. Table 2 shows an example of the dictionary data.

TABLE 2

| No. | Word |
|---|---|
| 1 | order form |
| 2 | Quotation |
| 3 | delivery statement |
| 4 | order acknowledgment |
| 5 | ... |
| 6 | ... |

Now, in the above-described preview screen 700 of FIG. 7B, it is assumed that the character area of "Q" is selected. In this case, "Q" which is a character string extracted from the character area of "Q" is compared with each word in the dictionary data shown in Table 2, and it is determined whether there is a word matching at the beginning. In this example, it is determined that No. 2 "quotation" matches at the beginning. In this manner, in a case where the dictionary data includes a word matching at the beginning, the process advances to step 1203. Meanwhile, in a case where the dictionary data does not include a word matching at the beginning, the present process is finished and the process advances to step 1111 of the flow of FIG. 11.

In step 1203, it is determined whether there is a character area being continuous from the character area currently selected. In the present embodiment, it is determined whether there is a continuous character area on the right side according to the same method used in the process of step 1008 of the flow of FIG. 10. In a case where there is a continuous character area, the process advances to step 1204. Meanwhile, in a case where there is no continuous character area, the present process is finished and the process advances to step 1111 of the flow of FIG. 11.

In step 1204, OCR processing is performed on a character area determined to be continuous, and a character string obtained by the OCR processing is additionally stored in the above-described selected character string buffer. Accordingly, the character string in the character area being continuous to the character area currently selected is stored in the selected character string buffer, following the character string in the character area currently selected. Then, the process goes back to step 1202 and it is determined whether the dictionary data includes a word matching with the beginning of the character strings stored in the selected character string buffer including the additionally stored character string. At the point when there is no continuous character string, the present process is finished. Accordingly, character strings extracted from all of the character areas being continuous to the character area currently selected are stored sequentially in the selected character string buffer.

The above description is the content of the character string automatic selection process. Accordingly, in a case where the character area of "Q" is selected, for example, the character areas of "U" and "O" being continuous to the right side of "Q" are also selected automatically. That is, the user can omit touch operation and selection of the character area of "U" and the character area of "O." Referring back to the flow of FIG. 11, description will be given.

In step 1111, all of the character strings stored in the selected character string buffer are set as the constituent elements of a file name. At this time, in a case where the file name input field 701 includes a character string that is already set, the character strings stored in the selected character string buffer are added to the end of the character string that is already set. Then in step 1112, the character strings after the additional setting in step 1111 are displayed in the file name input field 701.

The above description is the content of the file name generating process according to the present embodiment.

Modification Example

In some cases, the file name obtained in the above-described manner may not include a delimiter contrary to a user's intention. Accordingly, the user may manually insert a delimiter so that the file name can be corrected. In this case, for example, a button for inserting a delimiter is displayed between character areas if a delimiter is not inserted between the character areas based on a result of determination that the character areas are continuous. In the above-described example of FIG. 7B, this button is displayed in the preview area 710, between the character area of "Q" and the character area of "U" and between the character area of "U" and the character area of "O." Then, if the user presses the button, a delimiter is configured to be inserted in a corresponding position in the character string forming the file name. At this time, every time the button is pressed, the types of delimiters (for example, four types: a hyphen, an underscore, a space, and no delimiter) may be switched. Furthermore, instead of providing a button in the preview area 710, a balloon indicating a candidate position for insertion of a delimiter may be displayed in the character string displayed in the file name input field 701. Incidentally, the present modification example is also applicable to the first embodiment.

According to the present embodiment, in a case where constituent characters of a word desired to be given to a file name and the like are separated into a plurality of character areas, the character areas are automatically selected as one continuous string of characters without requiring a user to select all of the character areas. This allows the user to more efficiently set a file name and the like for a scan image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

According to the present invention, by using a character recognition result of a scan image, a user can set a file name and the like for the scan image with simple operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-159540, filed Aug. 22, 2017 which is hereby incorporated by reference wherein in its entirety.

What is claimed is:

1. An apparatus for generating supplementary information to be set for a scan image obtained by scanning a document, comprising:
    a memory that stores a program; and
    a processor that execute the program to perform:
    displaying the scan image on UI screen, wherein at least one character area included in the displayed scan image is selected by a user;
    obtaining at least one character string by performing OCR (Optical Character Recognition) processing on the at least one character area selected by the user via the UI screen; and
    generating the supplementary information based on the at least one character string obtained by performing the OCR processing on the selected at least one character area,
    wherein, in a case where the user selects a plurality of character areas and where a positional relation between the selected plurality of character areas does not satisfy a predetermined condition, the supplementary information is generated by inserting a delimiter between the character strings that are obtained by performing the OCR processing on the selected plurality of character areas, and
    wherein, in a case where the user selects a plurality of character areas and where the positional relation between the selected plurality of character areas satisfies the predetermined condition, the supplementary information is generated, without inserting the delimiter, based on the character strings that are obtained by performing the OCR processing on the selected plurality of character areas.

2. The apparatus according to claim 1, wherein the predetermined condition is that a character area currently selected by the user and a character area selected immediately before the character area currently selected are continuous in a specific direction.

3. The apparatus according to claim 1, wherein the predetermined condition is satisfied in a case where it is determined that a reference position in a character area currently selected by the user is identical to a reference position in a character area selected immediately before the character area currently selected and that the character area currently selected is adjacent to the character area selected immediately before the character area currently selected.

4. The apparatus according to claim 3, wherein it is determined that the character area currently selected is adjacent to the character area selected immediately before the character area currently selected in a case where there is no other character area between the character area currently selected and the character area selected immediately before the character area currently selected.

5. The apparatus according to claim 4, wherein it is determined that the character area currently selected is adjacent to the character area selected immediately before the character area currently selected in a case where there is no other character area between the character areas and where the distance between both character areas is equal to or less than a predetermined threshold.

6. The apparatus according to claim 5, wherein the predetermined threshold is less than three times a height of a character area selected by a user.

7. The apparatus according to claim 1, wherein the apparatus has dictionary data in which a plurality of words are registered, and
    in a case where the dictionary data includes a word matching with the beginning of a character string extracted from a character area currently selected by a user, the processor further performs the OCR processing on a character area being continuous to the selected character area in a specific direction, and generates the supplementary information by using a character string extracted in the OCR processing.

8. The apparatus according to claim 2, wherein the specific direction is determined based on a format of the document or a language used in the document.

9. The apparatus according to claim 1, wherein
    the processor further performs:
    displaying a button for inserting a delimiter between character strings which form the generated supplementary information; and
    inserting a delimiter in a position of the button pressed by a user.

10. The apparatus according to claim 1, wherein
    the supplementary information is a file name of the scan image.

11. The apparatus according to claim 1, wherein
    the supplementary information is a path name indicating an upload destination to which the scan image is uploaded.

12. The apparatus according to claim 1, wherein
    the supplementary information is a facsimile number with which the scan image is transmitted via facsimile.

13. The apparatus according to claim 1, wherein
    the supplementary information is an email address to which the scan image is transmitted via e-mail.

14. A control method of an apparatus for generating supplementary information to be set for a scan image obtained by scanning a document, the control method comprising:

displaying the scan image on a UI screen, wherein at least one character area included in the displayed scan image is selected by a user; and obtaining at least one character string by performing OCR (Optical Character Recognition) processing on the at least one character area selected by the user via the UI screen; and generating supplementary information based on the at least one character string obtained by performing the OCR processing on the selected at least one character area, wherein, in a case where the user selects a plurality of character areas and where a positional relation between the selected plurality of character areas does not satisfy a predetermined condition, the supplementary information is generated by inserting a delimiter between the character strings that are obtained by performing the OCR processing on the selected plurality of character areas, and wherein, in a case where the user selects a plurality of character areas and where the positional relation between the selected plurality of character areas satisfies the predetermined condition, the supplementary information is generated, without inserting the delimiter, based on the character strings that are obtained by performing the OCR processing on the selected plurality of character areas.

15. A non-transitory computer readable storage medium storing a program for causing a computer to perform:

displaying a scan image on a UI screen, wherein at least one character area included in the displayed scan image is selected by a user;

obtaining at least one character string by performing OCR (Optical Character Recognition) processing on the at least one character area selected by a user via the UI screen; and generating supplementary information based on the at least one character string obtained by performing the OCR processing on the selected at least one character area, wherein, in a case where the user selects a plurality of character areas and where a positional relation between the selected plurality of character areas does not satisfy a predetermined condition, the supplementary information is generated by inserting a delimiter between the character strings that are obtained by performing the OCR processing on the selected plurality of character areas, and wherein, in a case where the user selects a plurality of character areas and where the positional relation between the selected plurality of character areas satisfies the predetermined condition, the supplementary information is generated, without inserting the delimiter, based on the character strings that are obtained by performing the OCR processing on the selected plurality of character areas.

16. The apparatus according to claim 1, wherein the delimiter is a specific symbol or a specific character.

17. The apparatus according to claim 16, wherein the delimiter is an underscore, a hyphen or a space character.

* * * * *